United States Patent [19]
Wheatley

[11] Patent Number: 5,251,951
[45] Date of Patent: Oct. 12, 1993

[54] TONNEAU COVER AND SUPPORT MEANS

[76] Inventor: Donald G. Wheatley, 4451 Ford Rd., Ann Arbor, Mich. 48105

[21] Appl. No.: 888,019

[22] Filed: May 26, 1992

Related U.S. Application Data

[63] Continuation-in-part of Ser. No. 612,482, Nov. 14, 1990, Pat. No. 5,121,960, which is a continuation-in-part of Ser. No. 339,223, Apr. 17, 1989, Pat. No. 5,058,652, which is a continuation-in-part of Ser. No. 000,324, Jan. 5, 1987, abandoned, which is a continuation of Ser. No. 650,275, Sep. 14, 1984, abandoned.

[51] Int. Cl.⁵ .............................................. B60P 7/04
[52] U.S. Cl. ..................................... 296/100; 160/328
[58] Field of Search ................ 296/100; 160/327, 378, 160/328, 354, 368.1, 369, 383, 399, 398, 404

[56] References Cited

U.S. PATENT DOCUMENTS

| | | | |
|---|---|---|---|
| 1,060,664 | 5/1913 | Beaudry | 160/378 |
| 3,936,077 | 2/1976 | Bliek | 296/100 X |
| 4,403,642 | 9/1983 | Morris | 160/328 X |
| 4,639,033 | 6/1987 | Wheatley et al. | 296/100 |
| 4,730,866 | 3/1988 | Nett | 296/100 |
| 4,838,602 | 6/1989 | Nett | 296/100 |
| 5,058,652 | 10/1991 | Wheatley et al. | 160/327 |
| 5,076,338 | 12/1991 | Schmeichel et al. | 296/100 X |
| 5,152,574 | 10/1992 | Tucker | 296/100 |
| 5,165,750 | 11/1992 | Pirhonen | 296/100 |

FOREIGN PATENT DOCUMENTS 2225599 12/1974 France .......................... 160/327

Primary Examiner—Dennis H. Pedder
Attorney, Agent, or Firm—Charles W. Chandler

[57] ABSTRACT

A tonneau cover structure in which the rear rail of the frame is at least partially movable by pivotal or longitudinal movement between a location relatively closer to the front rail to facilitate attaching the flexible sheet to the frame or detaching it from the frame and a second location at a greater distance from the front rail to hold the attached cover taut.

13 Claims, 6 Drawing Sheets

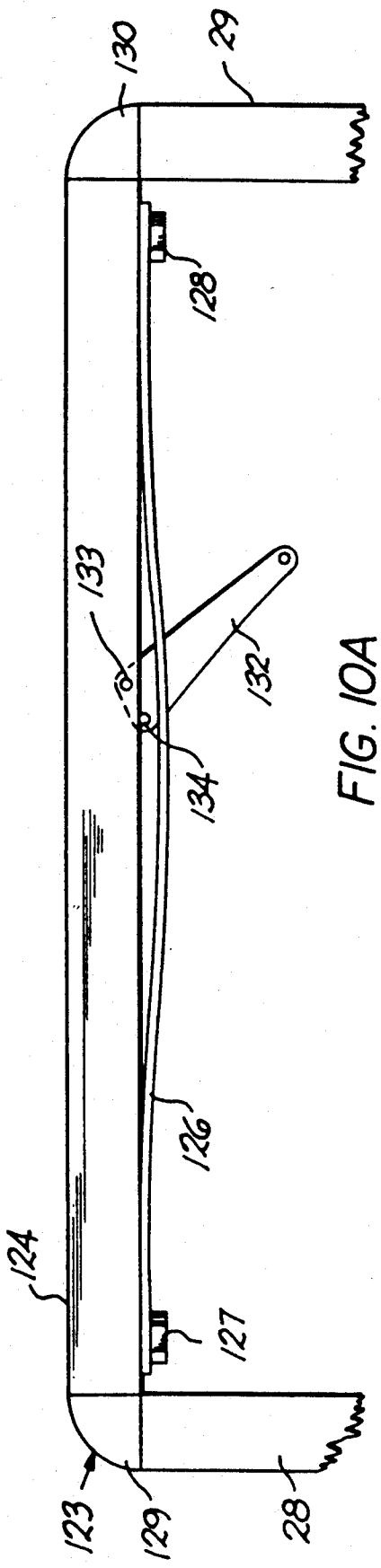
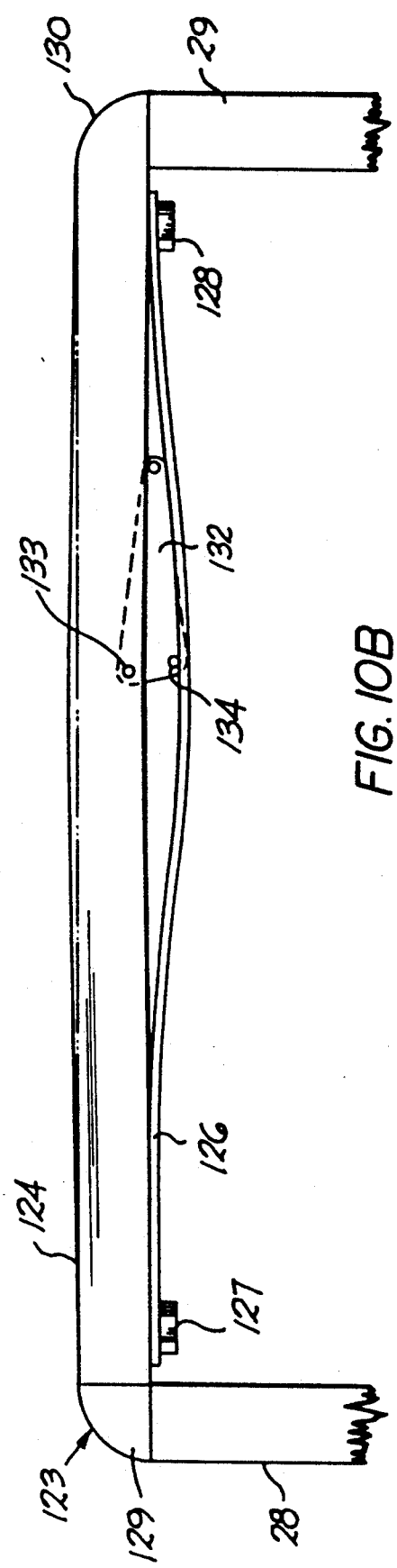

5,251,951

TONNEAU COVER AND SUPPORT MEANS

CROSS REFERENCE TO RELATED APPLICATIONS

This is a continuation-in-part of Ser. No. 612,482, filed Nov. 14, 1990, now U.S. Pat. No. 5,121,960 which is a continuation-in-part of Ser. No. 339,223 filed Apr. 17, 1989 and issued Oct. 2, 1991 U.S. Pat. No. 5,058,652, which was a continuation-in-part of Ser. No. 000,324, filed Jan. 5, 1987, now abandoned, which was a continuation Ser. No. 650,275, filed Sep. 14, 1984, now abandoned.

BACKGROUND OF THE INVENTION

This invention relates to tonneau covers to be placed over the cargo carrier of a vehicle, such as the bed of a pick-up truck or the like. In particular, the invention relates to an arrangement of the cover structure to facilitate attaching the flexible sheet component of the cover to the frame component, and especially, to compensate for problems caused by the fact that the sheet is made of non-isotropic material, so described because it is stiffer in a certain direction than in the perpendicular direction.

The type of tonneau covers currently used for covering the bed of a pick-up truck includes two primary components: a sheet of fabric or other flexible, preferably waterproof, material, and a frame to which the perimeter of the sheet is removably attached. The frame comprises elongated members, referred to as rails, that are normally extruded of durable, lightweight material, such as aluminum. Three of the rails are joined together by corner members and are rigidly attached to the side walls and the front walls of the bed by clamps, bolts, or adhesive means to extend along the upper rims of those walls, as shown in our U.S. Pat. Nos. 4,639,033 and 5,058,652, as well as in U.S. Pat. Nos. 4,730,866 and 4,838,602 of Nett.

In addition, tonneau cover frames currently in use also include another rail that overlies the tailgate. This rear rail extends between corner members at the rear ends of the side rails and is rigidly but not permanently attached to those members. All of the rails can be separated from the corner members to which they are connected, as shown in Ser. No. 612,482, supra. Such tonneau frames may be referred to as perimeter frames since they correspond to the perimeter of the sheet. They also correspond in size and configuration to the perimeter of the truck bed.

Our U.S. Pat. No. 4,639,033 discloses a tonneau cover structure in which a fabric sheet is attached to the rails of a perimeter frame by extruded elastomeric strips, each of which is attached to the lower surface of the sheet facing the frame. The elastomeric strips are referred to as J strips because they have a generally J-shaped cross-sectional configuration, with a flat part and a part that is curled. The flat part is sewn flat against the sheet. The curled edge is parallel to and adjacent the respective edge of the sheet, curving downwardly and inwardly so that it can be attached to its respective frame rail by being hooked over an outwardly facing edge of the rail. The dimensions of the sheet and rail structure were so related that the curled portion of each of the strips has to be uncurled to some extent to force it over the edge of the rail, either to hook or release the sheet from that edge. In attaching a strip to one of the frame rails, it is possible to press downwardly on the sheet directly over the curl along the outer region of one of the frame rail edges with sufficient force to force that curled portion past the rail edge to which it is being attached, whereupon the curled edge suddenly uncoils back to its normal curvature and snaps into place behind the rail edge.

The resilience of the J strip accommodates oversized frames and contraction of the sheet in cold weather by allowing the curled edge of the J strip to unwind to some extent. However, each of these factors makes it more difficult to either attach a tonneau cover sheet to or to detach it from the frame than it would be to perform those procedures under more desirable conditions. There is a limit to how much change in length such unwinding can provide. In addition, the fact that the sheet is also non-isotropic, i.e., that it is stiffer in the direction in which it is pulled during its fabrication than it is in the transverse direction, adds to the difficulty of fastening it to the frame.

The material used to make tonneau cover sheets is supplied on rolls. The greater stiffness is in the longitudinal direction wound around the core. The width of the material obtained on such rolls is sufficient to form the width dimension of a tonneau sheet but not great enough to form the longitudinal dimension. As a result, when a piece of the material long enough to produce a tonneau cover is cut from a roll, the stiffer direction of the cover sheet formed from that piece will be oriented in the longitudinal direction on the truck bed.

U.S. Pat. No. 5,058,652, discloses a tonneau cover frame that includes an extruded frame rail affixed to the top rim of the front wall of a truck bed. The frame has two or more flanges, each of which could receive an extruded elastomeric strip fastener. Such a frame structure provides for specific increments of change in the overall length of the sheet material to be attached to it, but it does not accommodate continuous changes in length that take place as the temperature goes from one level to another.

Furthermore, if the sheet is attached to the frame by snap fasteners, as shown in our application Ser. No. 612,482 and in the Nett patents, or by other means that do not permit incremental change, or that makes such change difficult, it is desirable to keep the sheet stretched to the desired degree of tautness when the temperature changes or when other conditions occur that change the tautness of the fabric.

SUMMARY OF THE INVENTION

It is one of the objects of this invention to provide a tonneau cover frame structure that makes it possible to attach a tonneau cover sheet to a tonneau cover frame easily and to detach it easily.

It is a particular object to attach and detach the rear edge of a tonneau sheet easily.

Another object of this invention is to provide a structure to hold the sheet material of a tonneau cover so as to accommodate changes between the relative dimensions of the sheet and the frame due to changes in the temperature or for any other reason.

In accordance with this invention, certain parts of the frame of a tonneau cover, at least parts of the rear rail to which the sheet material of the cover is attached, are movable in the longitudinal direction of the tonneau cover relative to the front rail of the frame. This allows the distance between the front rail and the movable parts of the rear rail to be changed to facilitate attaching the sheet material to parts of the rear rail as well as to facilitate detaching the sheet from those parts. Making the rear rail, or part thereof, movable helps keep the sheet properly taut while it is in place on the vehicle. The parts of the rear rail to which the sheet material is attached can be areas of the edge of the rear rail engaged by elastomeric fastener means, such as a J strip. Alternatively, such parts can be snap fasteners on the rear rail in locations to be engaged by snap fasteners on the sheet material. The locations of such parts on the rear rail relative to the front rail can be changed by pivoting the rear rail about an axis parallel to its length or by moving at least the parts of the rear rail longitudinally toward and away from the front rail.

The invention will be described in greater detail in connection with the drawings in which the same reference numerals in different figures refer to the same part.

DESCRIPTION OF THE DRAWINGS

FIGS. 10A and 10B show two positions of another rear rail with different means to apply translational force thereto.

DESCRIPTION OF THE PREFERRED EMBODIMENT

Figure 1:
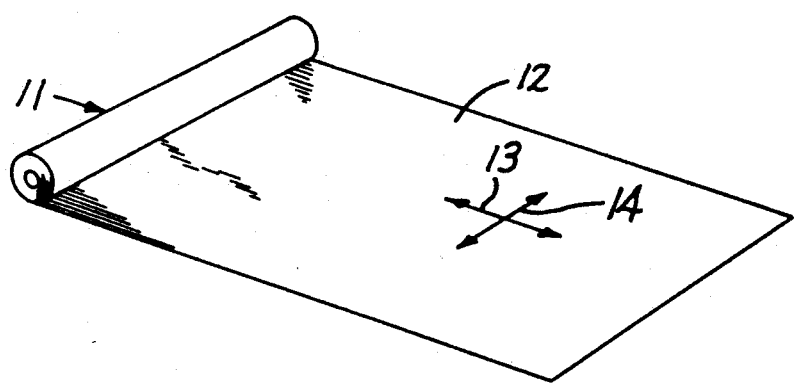
FIG. 1 shows a roll of tonneau cover sheet material.

FIG. 1 shows a roll 11 of sheet material 12, which is typically a vinyl material of a type suitable for use as a tonneau cover sheet. In the manufacture of the material, it is pulled longitudinally, which is the direction indicated by arrow 13. This pulling causes the material to be stiffer in that direction than in the perpendicular direction indicated by arrow 14, across the width of the sheet material 12. The material also has a different coefficient of thermal expansion in the directions of the two arrows; it is higher in the direction of arrow 13 than in the direction of arrow 14.

The material 12, as supplied by its manufacturers to manufacturers of tonneau covers, is wide enough to go across a truck bed from side to side. A pick-up truck typically has a bed that is longer than it is wide, and therefore, material 12, when cut to be used to make a tonneau cover, cannot be cut so that its width dimension extends from front to rear. Instead, the longer dimension of the sheet will be in the longitudinal direction of the material 12, i.e., in the direction of arrow 13, causing the resulting cover to be stiffer from front to back than from side to side.

Figure 2:
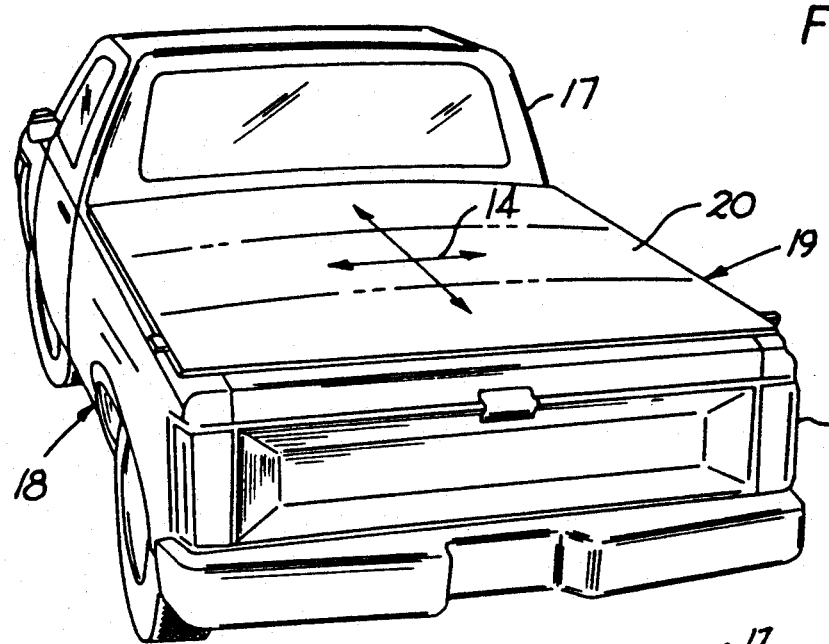
FIG. 2 shows a pick-up truck having a tonneau cover according to this invention.

FIG. 2 shows a truck 16, which has a cab 17 and a bed 18 on which is mounted a tonneau cover 19 consisting of a sheet component and a perimeter frame component. All that can be seen of the tonneau cover in this figure is sheet component 20, which has been made so that the direction of greater stiffness indicated by arrow 13 is in the longitudinal direction of bed 18.

Figure 3:
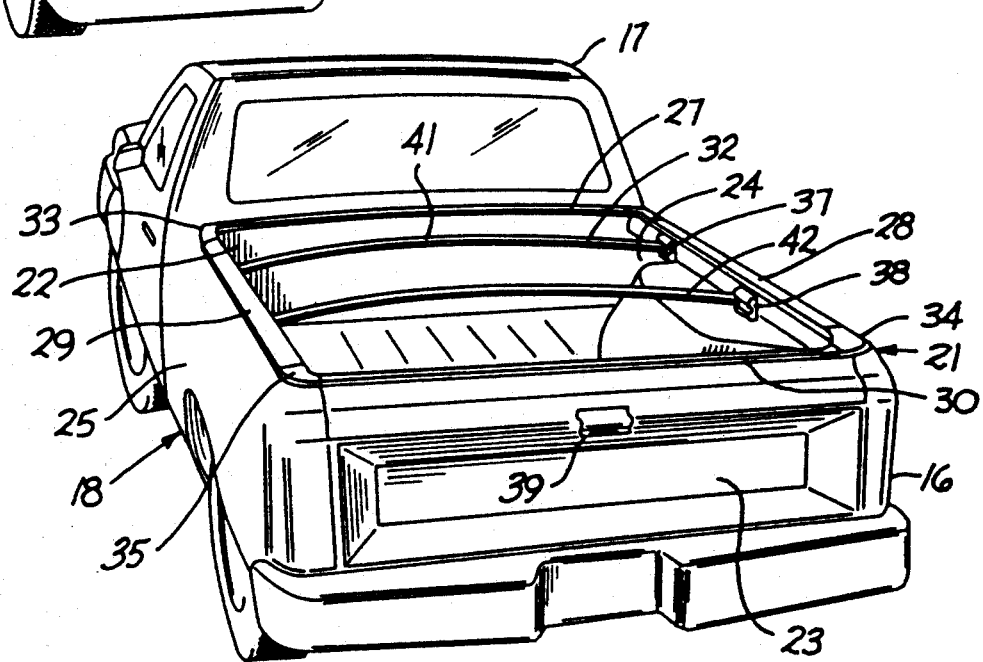
FIG. 3 is a perspective view of the truck in FIG. 2 with the tonneau cover sheet removed.

In FIG. 3, truck 16 is shown with sheet 20 removed so that more of the bed 18, as well as a tonneau cover frame 21 mounted thereon, can be seen. The truck bed, which is frequently called a cargo box because of its configuration, is bounded by four walls, including a front wall 22, a rear wall, or tailgate, 23, and two side walls 24 and 25. The length of the side walls determines the longitudinal dimension of the bed. The length of the front and rear walls determines the transverse dimension.

All four walls 22–25 have upper rims broad enough to support long, slender, extruded rails 27–30 and corner members 32–35 that make up frame 21. Front rail 27 is rigidly attached to the rim of front wall 22, for example by being bolted or adhesively affixed thereto. Side rails 28 and 29 are mounted on the rims of side walls 24 and 25, respectively, rigidly held in place by means of clamps. Only two of these clamps, identified by reference numbers 38 and 37 attaching the side rail 28 to the side wall 25, are visible in this figure. Similar clamps secure the opposite side rail 29 to side wall 25.

Rear rail 30 is not secured directly to the rim of tailgate 23, although it extends along the top of that rim. Instead, rail 30 is attached to the rear end portions of the side rails 28 and 29, and, specifically, to corner members 34 and 35 that are rigidly attached to the rear ends of side rails 28 and 29, respectively. As is standard practice in pick-up trucks, tailgate 23 is hinged to rotate about an axis at or close to its lower edge 38 and is released from engagement with side walls 24 and 25 by operation of a handle 39. When the tailgate is lowered, its upper rim pivots away from the upper rims of side walls 24 and 25 and is no longer under rear rail 30.

Two bows 41 and 42 extend across bed 18 from clamps 38 and 37, respectively, to corresponding clamps on the other side wall 25 to help keep sheet 20 taut and to provide the proper pitch to cause water to run off of the cover.

Figure 4A:
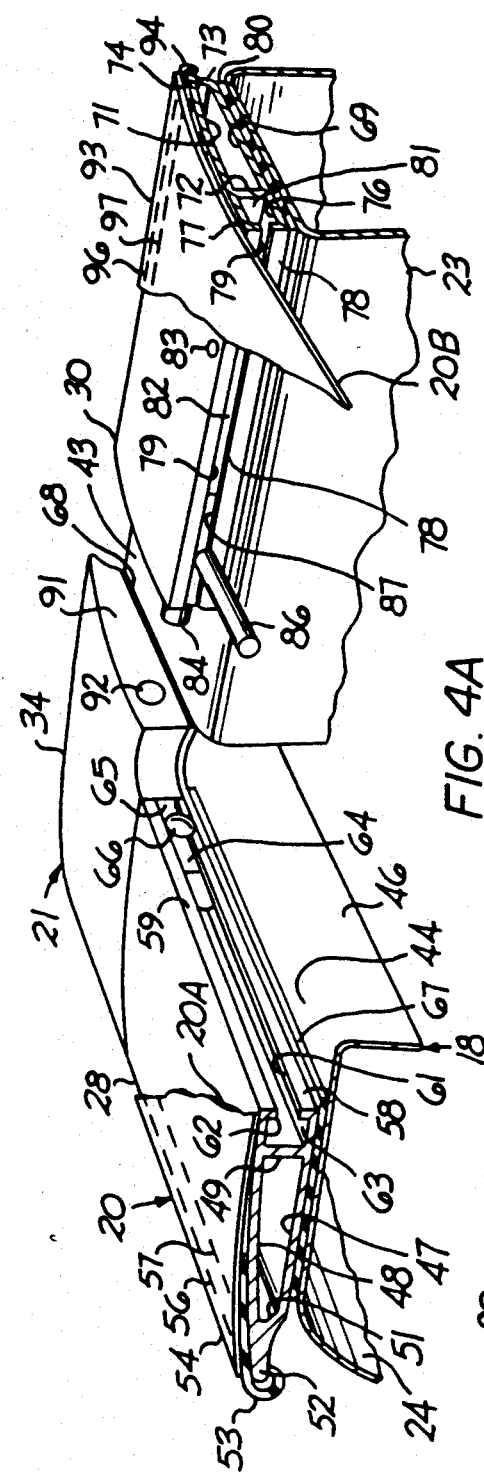
FIGS. 4A and 4B are perspective views of a fragment of the rear part of the tonneau cover in FIG. 2 in two positions.
Figure 5:
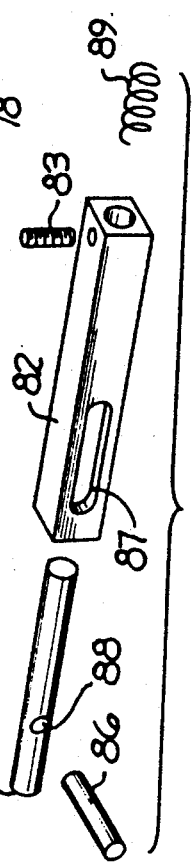
FIG. 5 is an exploded view of a pivotal mounting insert as used in the tonneau cover in FIGS. 4A and 4B.
Figure 4B:
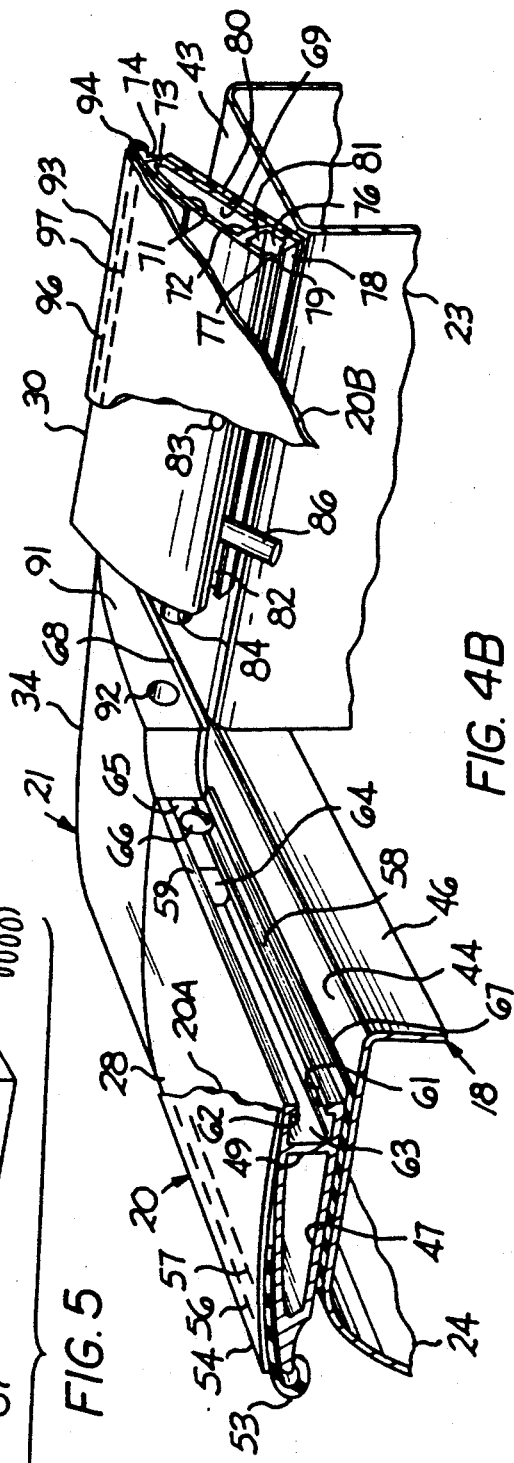

FIGS. 4A, 4B and 5 show components associated with a fragment of one rear corner of bed 18, including part of side wall 24 and tailgate 23. A mirror image of what is shown in these figures is also located at the other rear corner of the bed. The tailgate has a relatively flat rim, or top surface, 43. Side wall 24 has a relatively flat rim 44 that is substantially coplanar with rim 43. A partial wall 46 facing the interior of bed 18 extends down from the inner edge of rim 44. Clamps 38 and 37 in FIG. 3 are secured to wall 46, thereby securing side rail 28 rigidly to side wall 24. The clamping structure is shown in greater detail in our application Ser. No. 612,482, now U.S. Pat. No. 5,121,960, and is incorporated in this description by reference.

Side rail 28 has a bottom plate 47 and a top plate 48 joined together by an inner web 49 and an outer web 51. The bottom plate is substantially flat. The top plate may also be flat, but it is slightly cylindrically curved in this embodiment. It may also have other configurations, but in all cases, it slopes toward the plane of the bottom plate at its outer edge 52. The outer edge of top plate 48 can conveniently serve as an edge over which the curved edge of an elastomeric J strip 53 may be hooked by techniques described in detail in the ancestral applications and patents of the current case. The J strip is shown sewn parallel to a side edge 54 of sheet 20 by seams 56 and 57. Only a small fragment 20A of sheet 20 is shown attached to J strip 53 in order not to obscure various parts of frame 21.

Bottom and top plates 47 and 48 in this embodiment have edges 58 and 59 that face inwardly, that is, toward the interior space of bed 18 and are spaced to form the thickest part of rail 28. A flange 61 extends up from bottom plate 47 a short part of the way toward top plate 48. A flange 62 extends down from top plate 48 a short part of the way toward flange 61 with which it is juxtaposed. These flanges are spaced from and parallel to web 49 to define a channel 63 having a depth equal to that spacing and a height equal to the distance between the juxtaposed upper surface of bottom plate and lower surface of the top plate.

A plug 64, formed on a surface 65 of corner member 34 facing rail 28, is shaped to fit into the end of the channel. A machine screw 66 is screwed into the plug far enough to press firmly against web 49 to force the portions of plug 64 that face flanges 61 and 62 to press hard against those flanges to secure corner member 34 firmly to rail 28 by frictional engagement. A relatively soft pad 67 is located between bottom plate 47 and rim 44 to minimize vibrational noise and prevent scarring the rim. Another soft pad 68 is placed between corner member 34 and the rear end of rim 44 for the same purposes as pad 67.

Rear rail 30 in this embodiment has the same cross-sectional configuration as rail 28 and includes a bottom plate 69 and a top plate 71 joined to the bottom plate by webs 72 and 73. Web 73 joins top plate 71 at an outer edge 74. Web 72, an edge region 76 of bottom plate 69, an edge region 77 of top plate 71, and two small, juxtaposed flanges 78 and 79 that extend part of the way up from edge region 76 and part of the way down from edge region 77 combine to define a channel 81. A protective pad 80 is attached to the underside of rail 30 to protect rim 43 and reduce vibrational noise.

A hinge pin casing 82 having a cross section that fits channel 81, is slid into the channel and secured in place by a retainer 83, which can be a pin or screw, that extends through edge regions 76 and 77 and casing 82. A hinge pin 84 is slidably mounted in a round channel that extends longitudinally through the casing. Pin 86 extends through a slot 87 in a side wall of casing 82 and securely into a hole 88 in the hinge pin; pin 86 is used as a handle to retract hinge pin 84 back inside the casing. A spring 89 is held captive between retainer 83 and the end of hinge pin 84 to urge the hinge pin as far out of the casing 82 as slot 87 will allow pin 86 to move.

The difference between FIG. 4A and FIG. 4B is in the position of rear rail 30. In both figures, the rail is shown drawn back away from corner member 34 in the manner of an exploded representation in order to allow more parts to be visible. In use, the end of rail 30 abuts, or is very close to a surface 91 of corner member 34. In that position, hinge pin 84 enters a hinge pin hole 92 so that these components form pivotal mounting means for rail 30. While the longitudinal movement of the hinge pin is limited by the length of slot 87, it may be further limited by the depth of hole 92. It is important that the hole be deep enough to allow a sufficient part of the hinge pin to enter to make sure that it does not pop out by the jolting that takes place due to movement of the vehicle.

FIG. 4A shows rail 30 pivoted down so that its bottom plate 69 is substantially parallel to rim 43. In this position, rear edge 74 is at its maximum distance from front rail 27 shown in FIG. 3, thus holding sheet 20 taut. In order not to hide any components, only a small fragment 20B of the sheet is shown attached to rail 30. This fragment includes a part of rear edge 93, and, as in all of the other edges, a length of J strip 94 is sewn parallel to and adjacent edge 93 and hooked over the rear edge 74 of the rail.

FIG. 4B shows the rail 30 pivoted up so that its rear edge 74 is a little closer to front rail 27 than it is when the rail is pivoted down, as in FIG. 4A. This creates some longitudinal slack in cover sheet 20, as indicated by the fact that the small fragment 20B is shown sagging down rather than being held taut. The cover sheet slack makes it easier to attach J strip 94 to edge 74, as well as to detach the J strip from that edge when cover 19 is to be removed. Attachment of the J strips along the side rails, like the J strip 53, can be made after the front edge of the sheet 20 has been attached to front rail 22, and J strip 94 has been attached to rear rail 30. Then, with rail 30 pivoted to the position shown in FIG. 4A, the sheet will be taut. J strip 53 and its counterpart on the opposite side of bed 18 can be attached without having to take care to keep them stretched by hand.

Figure 6:
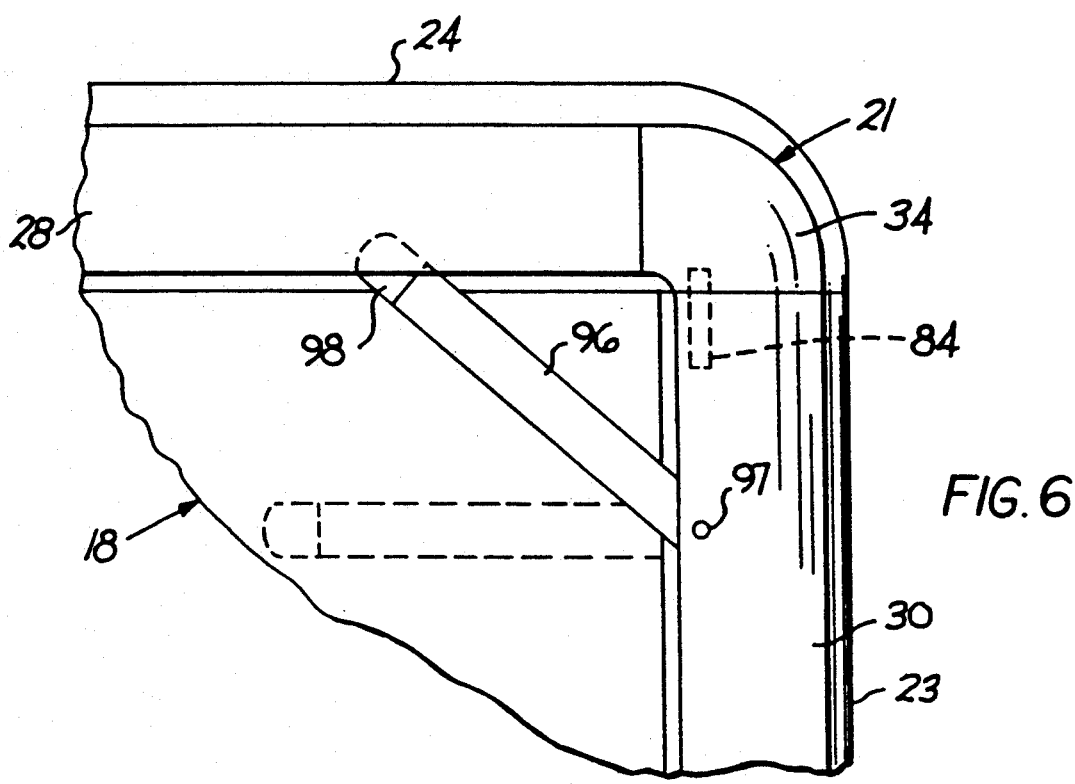
FIG. 6 is a top view of a fragment of a rear corner of a truck bed showing an operating handle for use in the tonneau cover in FIGS. 4A and 4B.
Figure 7:
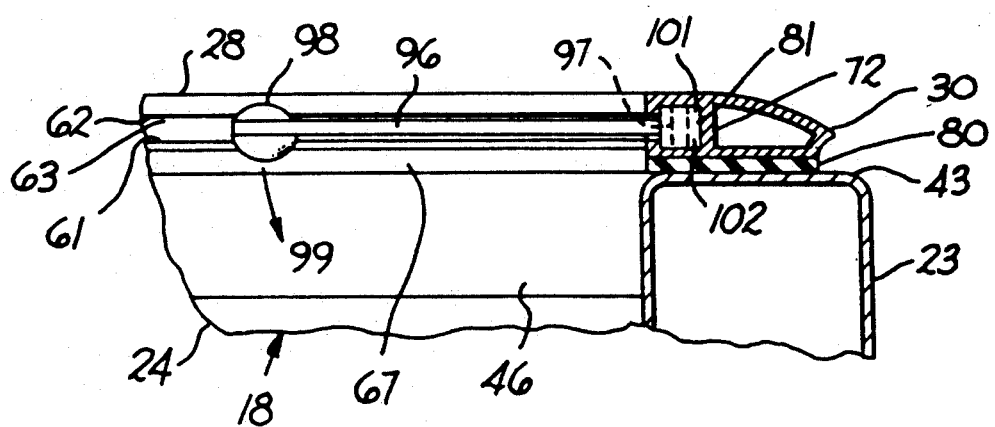
FIG. 7 is a cross-sectional side view of the fragment of the rear corner of the truck bed in FIG. 6.

FIGS. 6 and 7 are views of the same rear corner of bed 18 as shown in FIGS. 4A and 4B, except that a larger part of bed 18 is included to show means to pivot rear rail 30 to the positions shown in FIGS. 4A and 4B and to lock it in the position of FIG. 4A. Parts of tonneau cover frame 21 are shown, but cover sheet 20 is not. The means to pivot the rear rail in FIGS. 6 and 7 is a lever type handle 96 pivotally mounted on a pivot pin 97 in rail 30. The free end of the handle has latching means consisting, in this embodiment, of an elastomeric pad 98 small enough to be forced between flanges 61 and 62 and large enough to be held sufficiently tightly by those flanges so that the pad can only be freed by a deliberate effort. Handle 96 is shown in solid lines in FIG. 6 in its latched position, and in broken lines in its unlatched position. When the handle is in its unlatched position, as illustrated in FIG. 7, it is free to be pivoted down in the direction of an arrow 99 to pivot rear rail 30 counterclockwise about pivot pin 84. Pivot pin 97 is mounted between two blocks 101 and 102 that fit in the same channel 81 as casing 82 (FIG. 4A).

In order to reach handle 96 to move it to its unlatched position, and then to move it in the direction of arrow 99 to create slack in the cover sheet, it is preferable to lower the tailgate, which is the condition illustrated in FIG. 7. It is then a simple matter to reach in through the open tailgate area, grasp the handle, and move it as desired. It would be possible to leave the tailgate closed and disengage the rear part of the J strip on the side of the bed where the handle is located, but that would not take advantage of an important object of this invention, which is to make it easier to attach and detach all four edges of the tonneau cover sheet.

Figure 8A:
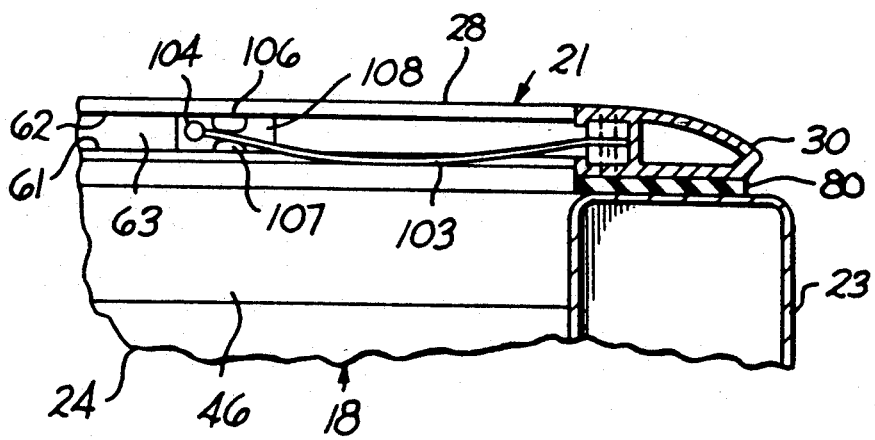
FIGS. 8A and 8B show a modified embodiment of the handle in FIG. 7 in two positions.
Figure 8B:
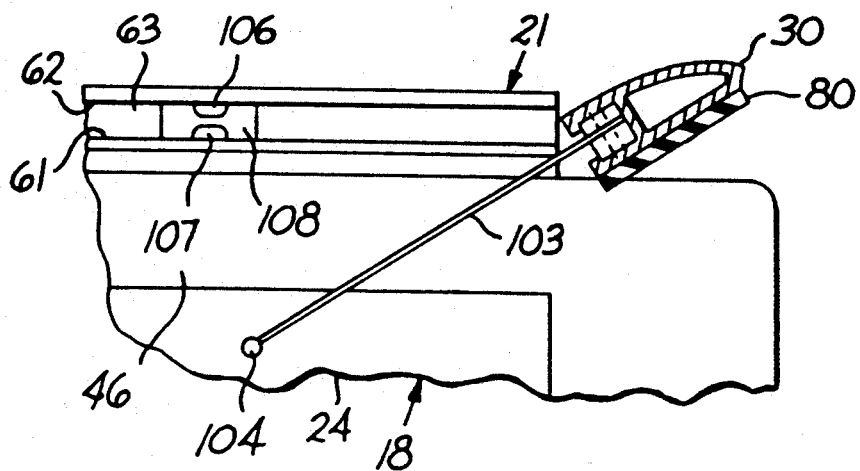

FIGS. 8A and 8B show another embodiment of a handle 103. In plan view, handle 103 looks much like handle 96, but handle 103 is a strip of resilient material, such as spring steel. As a result, the side view in FIGS. BA and BB shows handle 103 to be much thinner than handle 96. It has a protective knob 104 at its free end and is formed or bent so that, normally, the knob would not be in the plane of channel 63 of side rail 28, even when rear rail 30 is pivoted flat against rim 43 of the tailgate. The rear rail is locked in that position by forcing handle 103 up and over to the side to fit between two projections 106 and 107 mounted in a block 108 secured in channel 63. This force causes the handle to be bent, as shown in FIG. 8A, and the spring force stored in it is transmitted to tonneau cover sheet 20 when that sheet is in place as indicated in FIG. 2.

Figure 9:
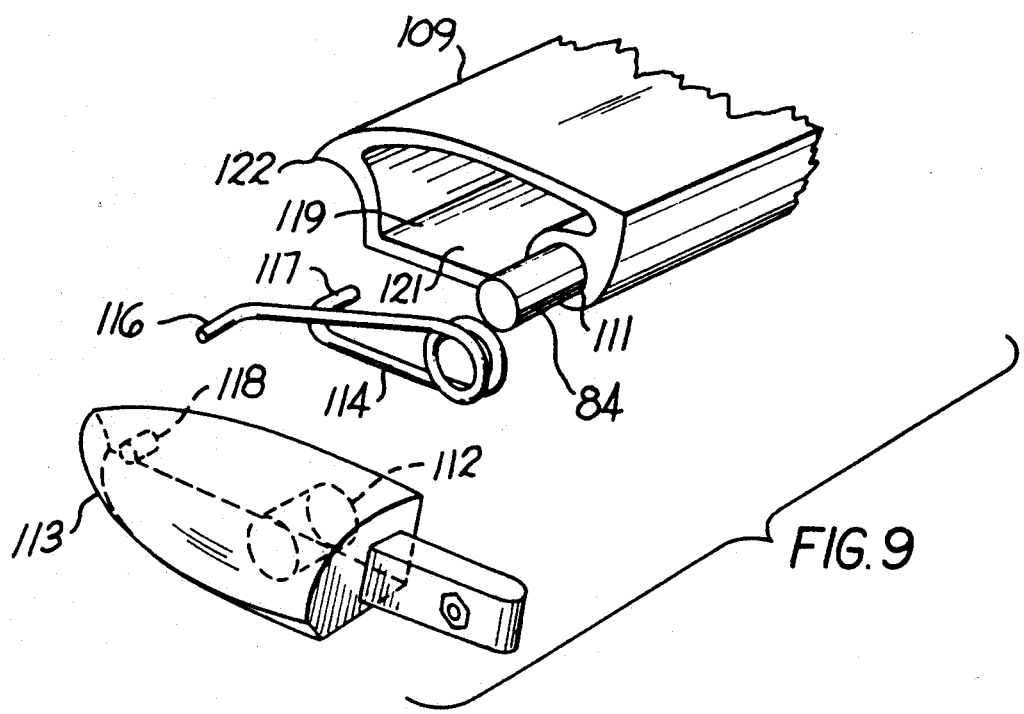
FIG. 9 is an exploded view of spring-loading means for a rear rail.

FIG. 9 shows another arrangement to apply resilient pressure to hold the rear rail down and the cover sheet taut. FIG. 9 shows a modified configuration of rear rail 109 that is formed with a round channel 111 in which pivot pin 84 is held directly, without any extra casing. The end of the pivot pin that extends from rail 109 fits into a pivot pin hole 112 in a corner member 113, the external surfaces of which resemble the external surfaces of corner member 34 in FIGS. 4A and 4B. A wire spring 114 has a loop large enough to fit over the pivot pin. Ends 116 and 117 of the spring are bent out at approximately 90°. End 116 fits into a hole 118 in corner member 113. End 117 extends into a channel 119, where it presses against a bottom wall 121 to exert a force that presses rear edge 122 down. This is the proper direction to exert stress on cover sheet 20 when that sheet is fitted onto rail 109.

The embodiments of the invention discussed thus far utilize means to move the rear rail to reduce the distance between it and the front rail to make it easier to attach and detach the cover sheet from the tonneau frame. FIGS. 10A and 10B show part of a tonneau frame 123 in which a rear rail 124 is subjected to longitudinal stress concentrated in its central region to move that part of the rear rail away from the front rail. The structure constituting force transmission means to apply that stress includes a sturdy strap 126 rigidly connected by bolts 127 and 128 to the side of rail 124 that faces the interior of the bed. These bolts are at the ends of the strap and engage rail 124 as close to the ends thereof as possible without interfering with the means connecting the rail to corner members 129 and 130 that join rail 124 to side rails 28 and 29, respectively. Preferably, bolts 127 and 128 ar closer to the ends of rail 124 than they are to its center.

Another part of the force-transmission means is a handle 132 pivotally mounted on a pivot pin 133 located in the central part of rail 124, substantially midway between the ends of the rail and pivotally movable in either the plane of frame 123 or a plane parallel to it. Handle 132 has engagement means in the form of a pin 134 engaging the side of strap 126 that faces rail 124. Pin 134 is located so that when the handle is at an angle to the rail, as shown in FIG. 10A, the strap is as nearly straight as possible. This is the relaxed condition of both rail 124 and strap 126, and pin 134 is directly between them, in this embodiment. The handle should be in this position when a tonneau cover sheet is either being attached to rail 124 or removed therefrom.

In FIG. 10B, rail 124 and strap 126 are in the stressed condition, and handle 132 has been pivoted to lie against the inwardly facing surface of the rail. Pin 134, which moves on an arc as the handle pivots, is almost as far from rail 124 as it can get. Actually, it has gone slightly past the point of maximum distance and is in a position in which the tension in the strap exerts a force on pin 134 that holds handle 132 firmly against rail 124. This is an over-center operation.

FIG. 10B illustrates the central regions of the rail and the strap separated. The strap has a low longitudinal elasticity, preferably as low as that of rail 124, so that the force transmitted from the handle to the rail and strap 126 by pivot pin 133 and pin 134 bend both the strap and the rail. This increases the distance between the central part of rail 124 and the front rail, which is useful in making the longitudinal central part of the tonneau cover sheet 19 (FIG. 3) taut during use.

Figure 11:
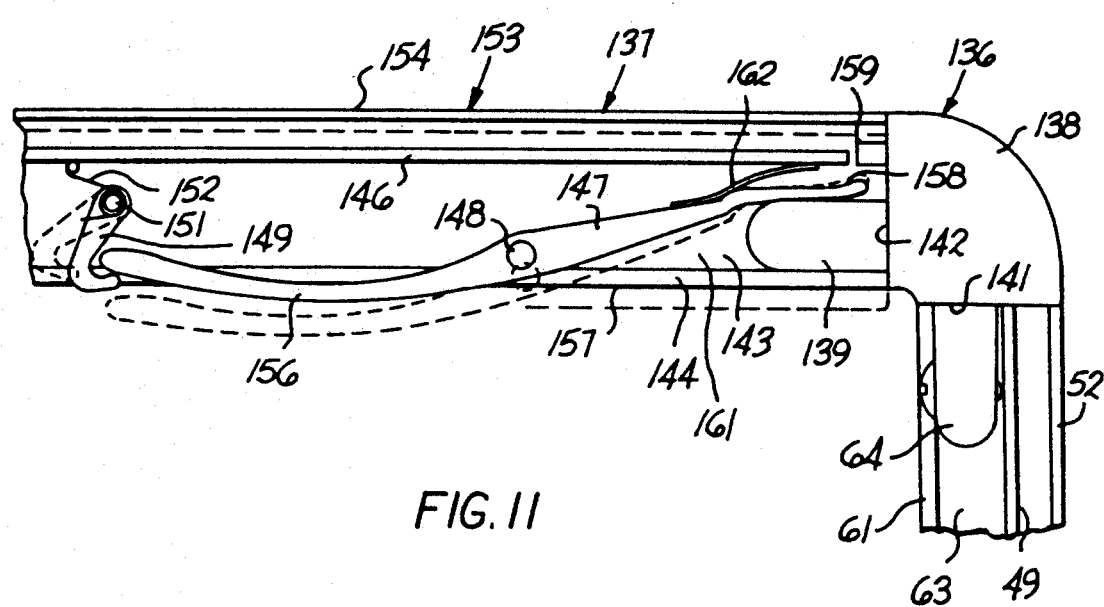
FIG. 11 is a top view of another way to apply translational force to a rail to change the position thereof.

FIG. 11 shows the left rear corner of a tonneau cover frame 136 that incorporates means to move a rear rail 137 longitudinally toward and away from front rail 27 to make it easier to attach and detach the cover sheet. A rear corner member 138 has plugs 64 and 139 extending from its sides 141 and 142 to enter channels 63 and 143, respectively, in side rail 29 and rear rail 137. The top surfaces of these rails have been cut away to reveal the interior components, but it is to be understood that the top surface of rear rail 137 is like those of the rails shown in the other embodiments of this invention. As in FIGS. 4A and 4B, plug 64 is held firmly in place in channel 63 by frictional engagement between one surface of the plug and the juxtaposed surface of flange 61, on one side, and the end of machine screw 66 and web 49, on the other side.

The external configuration of rear rail 137 is extruded with a cross section generally similar to that of rail 30 and other rails described previously herein, although the interior may differ in arrangement and dimensions. It has a flange 144 that is generally similar to flange 61 and a web 146 that is generally similar to web 49. Preferably, it also has an upper flange as a counterpart of flange 61, like flange 62 in FIGS. 4A and 4B. Plug 139 is pressed against flange 144 and its counterpart, if there is one, by a lever 147 pivotally mounted on a pivot pin 148 held in rail 137. This lever and rail 137 are shown in solid lines in the positions they occupy to hold the tonneau cover sheet taut, which can be considered to be the closed positions. The lever and rail are shown in broken lines in their open positions, i.e., the positions in which the cover sheet has slack that would make it easier to attach it to and detach it from the rear rail.

Lever 147 is held in the closed position by a spring-biased catch 149 pivotally mounted on another pivot pin 151 and urged by a spring 152 into the position shown in solid lines. While only one lever 147 is shown, it is preferable to have a second lever and plug at the opposite side of the tailgate to balance the translational force exerted on rail 137.

When catch 149 is pivoted to the position shown in broken lines, it releases lever 147, which can then pivot counterclockwise as the result of pressure on rail 137 in the direction of an arrow 153. Such pressure may be due, at least in part, to longitudinal tension in the tonneau cover sheet. It can also be produced by hand pressure against rear edge 154 of the rail. In addition, the left-hand end, or handle end, 156 of lever 147 could be formed so that it is curved far enough away from forward edge 157 to allow someone wishing to move the lever toward its open position to grasp handle end 156 and push the lever counterclockwise. As described in connection with the embodiment in FIG. 7, the tailgate, which is to be understood as being directly under rear rail 137 in the same way that the tailgate is directly under rear rail 30 in other embodiments, should be open to allow the person detaching the cover to reach in and actuate the force-transmission means, which is the lever 147, in this embodiment.

When the lever is pivoted counterclockwise, it can only travel a short arcuate distance before its end 158 engages web 146. Continuing to apply force in the same direction to the handle end 156 causes the lever to pivot about the end of plug 139, thereby moving pivot pin 148 forward and drawing the whole rail 137 with it until both lever 147 and the rail reach their broken line positions. In order to be sure that this movement of rail 137 is entirely translational and free of any attempt at pivotal movement about plug 139 as an axle, surface 142 may have a second projection 159 to prevent bottom wall 161 of rail 137 from rising up.

A spring 162 is shown between web 146 and lever 147 to apply force to keep the web and the lever apart. It is not mandatory that the spring be included; its use in this embodiment is optional. If used, it tends to hold the lever in contact with plug 139, thus causing rear rail 137 to start to move forward as soon as lever 147 starts to pivot counterclockwise. Spring 162 is a leaf spring, but it could be a coil spring, and it can be attached to either lever 147, or web 146.

Figure 12:
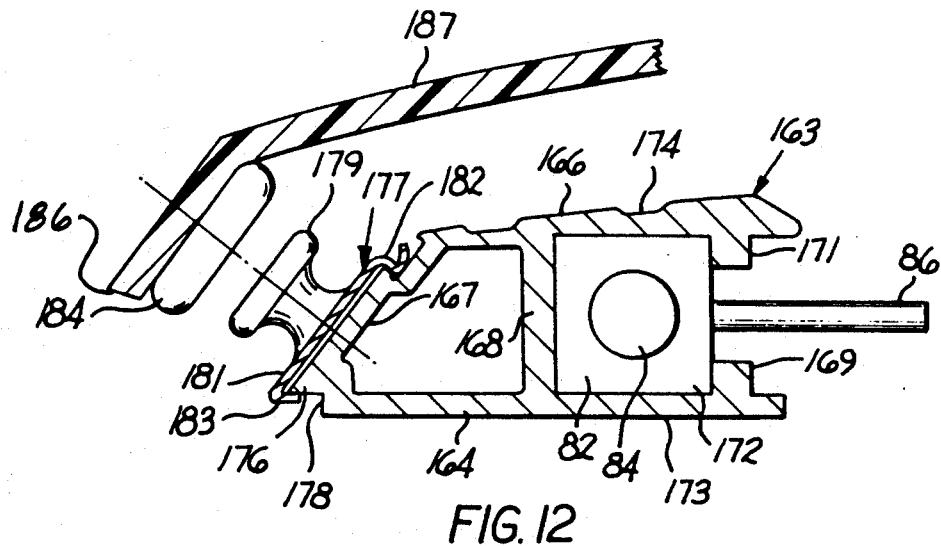
FIG. 12 is a cross-sectional view of another means for attaching a tonneau sheet to a movable tonneau frame member.

All of the embodiments described so far have used J strips to attach edges of the tonneau cover sheet to the frame. FIG. 12 shows an alternative embodiment in which snaps are used as attachment means, as described in application Ser. No. 612,482. The rails in any of the other embodiments could be modified to utilize snaps or other fastening means. The embodiment in FIG. 12 comprises a rail 163 having a bottom wall 164, a top wall 166, and two webs 167 and 168. The latter has two flanges 169 and 171 extending toward each other from the bottom and top walls, respectively, to define a channel 172 between these flanges, web 168, and edge regions 173 and 174 that are part of the bottom and top walls, respectively. These may be considered the forward regions because they project in the direction that would be the forward direction if rail 163 were installed as the rear rail on a truck bed. Hinge pin casing 82 of FIG. 5 is shown inserted into channel 172 so that rail 163 can pivot about hinge pin 84. However, a rail for supporting snap fasteners, as does rail 163, could also be used as a substitute for any of the other rails 27-29 in FIG. 2 or for rear rail 124 in FIGS. 10A and 10B or for rear rail 137 in FIG. 11.

The feature that distinguishes rail 163 from any of the others is that it includes means 176 for holding snap fastener means 177. The holding means is a ridge of male dovetail cross section extending from surface 178 of web 167. Snap fastener means 177 comprises a projection 179 attached to and extending from a base 181. In this instance, the projection is the male part of a complete snap fastener, but it could be the female part. The base has edges 182 and 183 that are bent inwardly to correspond, at least approximately, to the edges of dovetail ridge 176. Preferably, the base is made of a resilient material, such as spring steel, with edges 182 and 183 bent sufficiently to exert some frictional force on dovetail ridge 176 and not to slide too loosely along it. Thus, snap fastener means 177 can be slid into position to receive female snap fastener means 184 attached to fixed positions on the underside of an edge 186 of a cover sheet 187.

Snap fastener means 177 will remain in or close to those positions when the cover sheet is removed, thus making it easy to attach the cover sheet the first time, and each time thereafter, because they remain in those positions.

While this invention has been described in terms of specific embodiments, those skilled in the technology with which the invention is involved will recognize that other embodiments can be substituted without departing from the true scope of the invention.

What is claimed is:

1. Tonneau cover means for covering the cargo carrier of a vehicle, the cargo carrier being bounded by first and second side walls extending in the longitudinal direction of the vehicle on opposite sides of the cargo carrier and having upper rims, a front wall extending transversely across a front end of the cargo carrier, and an openable tailgate having an upper rim substantially coplanar with adjacent parts of the upper rims of the side walls, the tonneau cover means comprising:
    (a) flexible sheet means comprising front, side, and rear edges;
    (b) an elongated rear rail positionable along the upper rim of the tailgate, said rear rail having a rear edge section thereof attachable to the rear edge of said flexible sheet means whereby said sheet means is anchored to the rear rail; said rear rail being coextensive with the tailgate rim;
    (c) side rails extending along and directly above the upper rims of the side walls to anchor the side edges of said flexible sheet means;
    (d) means at the rear end of each side rail forming a pivot hole, said pivot holes being aligned to form a transverse pivot axis located above the upper rim of the tailgate; and
    (e) said rear rail having aligned hinge pins extending from its opposite ends for disposition in said pivot holes, whereby said rear rail can be pivoted downwardly around said pivot axis to tension the flexible sheet means in the longitudinal direction of the vehicle.

2. The tonneau cover means of claim 1, wherein at least one of said hinge pins is retractibly mounted in the rear rail, whereby said one hinge pin can be drawn out of the associated pivot hole and into the rear rail.

3. The tonneau cover means of claim 1, and further comprising at least one manually-operated latch carried by the rear rail for detained engagement with an associated side rail when said rear rail is in a position to tension the flexible sheet means.

4. The tonneau cover means of claim 3, wherein said manually-operated latch comprises a lever swingably mounted on said rear rail for movement in a horizontal plane when said rear rail is in a position to tension the flexible sheet means.

5. The tonneau cover means of claim 4, wherein said lever has a free end thereof adapted to grip an associated side rail to detain the rear rail against pivotal movement.

6. The tonneau cover means of claim 1, wherein said rear rail has a rear edge and a front edge; said hinge pins being located relatively close to the rail front edge and relatively remote from the rail rear edge.

7. The tonneau cover means of claim 1, wherein said flexible sheet means is detachably attached to the rear rail.

8. The tonneau cover means of claim 1, wherein each rail has a horizontal width dimension that is approximately the same as the width dimension of the associated rim; each rail being mountable on the associated rim so that the rail does not protrude into the cargo carrier space.

9. The tonneau cover means of claim 1, wherein each of said pivot hole forming means is a corner member having a curved outer edge, and two side edges angularly disposed with a ninety degree included angle; each of said corner members having one of its side edges abutting an end of the rear rail; each of said corner members having its other side edge abutting an end of an associated side rail.

10. Tonneau cover means for covering the cargo carrier of a vehicle, the cargo carrier being bounded by front and rear walls spaced apart in a longitudinal direction of the cargo carrier and extending in a transverse direction thereof, and first and second side walls spaced apart in the transverse direction and extending in the longitudinal direction on opposite sides of the cargo carrier, all of the walls having upper rims, the rear wall comprising a tailgate having a lower edge and being hinged to pivot about an axis in the region of its lower edge, the tonneau cover means comprising:
- (a) flexible sheet means to fit over the cargo carrier and having a perimeter region comprising front, side, and rear edges, and attachment means along the edges;
- (b) elongated rear rail means extending longitudinally along the upper rim of the tailgate and comprising engagement means to connect with the attachment means along the rear edge of the cover;
- (c) force-transmission means to apply force to at least selected parts of the rear rail means to move at least the selected parts of the rear rail means, with the rear edge of the sheet means attached thereto, between a first position in which the selected parts of the rear means are a first distance away from the front wall and a second position in which the selected parts of the rear rail means are a second distance, which is greater than the first distance, away from the front wall to stretch out at least parts of the sheet means attached to the selected parts of the rear rail means;
- (d) the force-transmission means comprising means to pivot the rear rail means about an axis generally parallel to the rim of the tailgate between the first position and the second position; and
- (e) the means to pivot the rear rail means comprising a handle attached to the rear rail means and extending therefrom into the cargo carrier to control movement of the rear rail means between the first position and the second position.

11. The tonneau cover means of claim 10 comprising:
- (a) pivotal mounting means on the rear rail means, the handle being pivotally mounted on the pivotal mounting means; and
- (b) latching means to latch the handle to hold the rear rail means in a predetermined one of the first and second positions.

12. The tonneau cover means of claim 10 in which the handle is resilient, whereby the handle exerts spring force on the rear rail means to hold the rear rail means in the second position when the handle is latched in the latching means.

13. The tonneau cover means of claim 10 comprising, in addition, side rail means, the latching means being on the side rail means.

* * * * *